(12) United States Patent
Saha et al.

(10) Patent No.: US 10,822,687 B2
(45) Date of Patent: Nov. 3, 2020

(54) ENVIRONMENTAL BARRIER COATING AND METHODS OF PREPARATION

(71) Applicant: General Electric Company, Schenectady, NY (US)

(72) Inventors: Atanu Saha, Bangalore (IN); Nicholas Edward Antolino, Schenectady, NY (US); Don Mark Lipkin, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 81 days.

(21) Appl. No.: 15/431,805

(22) Filed: Feb. 14, 2017

(65) Prior Publication Data
US 2017/0247787 A1    Aug. 31, 2017

(30) Foreign Application Priority Data
Feb. 29, 2016  (IN) .............................. 201641006985

(51) Int. Cl.
*C04B 35/505* (2006.01)
*C23C 12/00* (2006.01)
(Continued)

(52) U.S. Cl.
CPC .............. *C23C 8/62* (2013.01); *C04B 35/505* (2013.01); *C04B 41/009* (2013.01); *C04B 41/52* (2013.01);
(Continued)

(58) Field of Classification Search
CPC .................................. F01D 5/288; C23C 8/62
See application file for complete search history.

(56) References Cited

U.S. PATENT DOCUMENTS 8,658,255 B2    2/2014  Kirby et al.
8,658,291 B2    2/2014  Kirby et al.
(Continued)

FOREIGN PATENT DOCUMENTS

JP    2007-008806 A    1/2007
JP    2011-037701 A    2/2011
(Continued)

OTHER PUBLICATIONS

Lan, W., and Xiao, P., "Fabrication of yttria-stabilized-zirconia thick coatings via slurry process with pressure infiltration," Journal of the European Ceramic Society, vol. 29, pp. 391-401 (2009).
(Continued)

*Primary Examiner* — Alexander M Weddle
(74) *Attorney, Agent, or Firm* — General Electric; Kristi Davidson

(57) ABSTRACT

Methods of forming an environmental barrier coating are disclosed. A method includes disposing a powder-based coating on a substrate, heat-treating the powder-based coating at a temperature greater than 800° C. and less than 1200° C. to form a porous coating that includes surface-connected pores, infiltrating at least some of the surface-connected pores of the porous coating with an infiltrant material to form an infiltrated coating, and sintering the infiltrated coating at a temperature greater than 1200° C. and less than 1500° C. to form the environmental barrier coating on the substrate.

17 Claims, 2 Drawing Sheets

(51) Int. Cl.

| | | |
|---|---|---|
| *C23C 8/62* | (2006.01) | |
| *C04B 41/89* | (2006.01) | |
| *C04B 41/00* | (2006.01) | |
| *C04B 41/52* | (2006.01) | |
| *F01D 5/28* | (2006.01) | |
| *C04B 35/50* | (2006.01) | |
| *C23C 30/00* | (2006.01) | |

(52) U.S. Cl.
CPC ............. *C04B 41/89* (2013.01); *C23C 12/00* (2013.01); *C04B 35/50* (2013.01); *C23C 30/00* (2013.01); *F01D 5/288* (2013.01); *F05D 2300/15* (2013.01); *F05D 2300/211* (2013.01)

(56) References Cited

U.S. PATENT DOCUMENTS

| | | | |
|---|---|---|---|
| 8,673,400 | B2 | 3/2014 | Kirby et al. |
| 8,729,161 | B2 | 5/2014 | Kirby et al. |
| 9,005,717 | B2 | 4/2015 | Kirby et al. |
| 2006/0280954 | A1 | 12/2006 | Spitsberg et al. |
| 2007/0184204 | A1 | 8/2007 | Balagopal et al. |
| 2009/0004427 | A1* | 1/2009 | Sarrafi-Nour ......... C04B 41/009 428/76 |
| 2009/0206525 | A1* | 8/2009 | Sato ...................... B01J 20/103 264/610 |
| 2009/0297718 | A1 | 12/2009 | Sarrafi-Nour et al. |
| 2011/0027467 | A1* | 2/2011 | Kirby ................... C04B 41/009 427/140 |
| 2011/0027476 | A1 | 2/2011 | Kirby et al. |
| 2011/0027557 | A1 | 2/2011 | Kirby et al. |
| 2011/0027559 | A1 | 2/2011 | Kirby et al. |
| 2012/0077004 | A1 | 3/2012 | Kirby et al. |

FOREIGN PATENT DOCUMENTS

| | | |
|---|---|---|
| WO | 2006/018570 A1 | 2/2016 |
| WO | 2016/018570 A1 | 2/2016 |

OTHER PUBLICATIONS

Gbologah, L., et al., "Sol-gel Mullite-SiC Oxidation Protective Coating for Carbon-Carbon Composites," International Journal of Engineering Research, vol. 10, pp. 13-24 (2013).

Extended European Search Report and Opinion issued in connection with corresponding EP Application No. 17157939.4 dated Jun. 29, 2017.

Office Action issued in connection with corresponding CA Application No. 2958134 dated Feb. 21, 2018.

Machine Translation and Notification of Reasons for Refusal issued in connection with corresponding JP Application No. 2017-026514 dated Apr. 10, 2018.

Office Action issued in connection with corresponding CA Application No. 2958134 dated Oct. 1, 2018.

* cited by examiner

ENVIRONMENTAL BARRIER COATING AND METHODS OF PREPARATION

BACKGROUND

Embodiments of the present invention relate generally to environmental barrier coatings, and more particularly to methods of preparation thereof.

Silicon-based ceramic materials are currently being employed for high temperature components of gas turbine engines such as, for instance, airfoils (e.g., blades and vanes), combustor liners and shrouds. By way of example, silicon-based ceramic matrix composites (CMCs) may include fibers reinforcing a ceramic matrix phase. CMCs may, for instance, provide a desirable combination of high temperature mechanical, physical and/or chemical properties compared to more conventional materials, such as, for instance, iron, nickel and/or cobalt-based superalloys.

Although silicon-based ceramic materials exhibit desirable high temperature characteristics, such materials can suffer from rapid recession in combustion environments due to volatilization upon exposure to reactive species such as water vapor. In such cases, protective coatings, commonly referred to herein as environmental barrier coatings (EBC), are used to protect the silicon-based ceramic materials from volatilization processes. Furthermore, EBCs can serve as a thermal barrier between the combustion gases and underlying substrate. Slurry-deposited coatings, containing particles that comprise the EBC composition in a liquid carrier, have been used to deposit EBCs. However, standard slurry-based coating processes may require multiple deposition and sintering steps to achieve a desired EBC thickness without cracking, which may lead to lower productivity and longer cycle time.

Therefore, there is a need for a simple and cost-effective method for preparing thick, hermetic EBCs.

BRIEF DESCRIPTION

Embodiments of the invention are directed towards methods of forming an environmental barrier coating on a substrate.

In one embodiment, a method of forming an environmental barrier coating is disclosed. The method includes disposing a powder-based coating on a substrate, heat-treating the coating at a temperature greater than 800° C. and less than 1200° C. to form a porous coating that includes surface-connected pores, infiltrating at least some of the surface-connected pores of the porous coating with an infiltrant material to form an infiltrated coating, and sintering the infiltrated coating at a temperature greater than 1200° C. and less than 1500° C. to form the environmental barrier coating on the substrate.

In one embodiment, a method of forming an environmental barrier coating is disclosed. The method includes disposing a powder-based coating on a substrate, heat-treating the powder-based coating at a temperature greater than 1050° C. and less than 1200° C. to form a porous coating that includes surface-connected pores, and infiltrating at least some of the surface-connected pores of the first material with a second material to form an infiltrated coating. The method further includes sintering the infiltrated coating at a temperature greater than 1200° C. and less than 1400° C. An environmental barrier coating thus formed is substantially hermetic, and a thickness of the environmental barrier coating is greater than 100 microns.

BRIEF DESCRIPTION OF THE DRAWINGS

These and other advantages and features will be more readily understood from the following detailed description of preferred embodiments of the invention that is provided in connection with the accompanying drawing.

DETAILED DESCRIPTION

In the following specification and the claims that follow, the singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" or "substantially," may not be limited to the precise value specified, and may include values that differ from the specified value. In at least some instances, the approximating language may correspond to the precision of an instrument for measuring the value.

Some known methods for a thick EBC deposition using a slurry include constructing the EBC in a layer-by-layer manner and sintering the component after deposition of each layer. Therefore, the EBC layers may undergo multiple deposition and sintering steps, thereby increasing the process complexity for the EBC preparation. Some embodiments of the present invention are directed to the fabrication of thick, hermetic environmental barrier coating (EBC) on a substrate in a two-step process.

In some embodiments, a method of forming an EBC on a substrate is disclosed. The method includes disposing a powder-based coating on the substrate and heat-treating the powder-based coating at a temperature greater than 800° C. and less than 1200° C. to form a porous coating that includes surface-connected pores. The method further includes infiltrating at least some of the surface-connected pores of the porous coating with an infiltrant material, thereby forming an infiltrated coating. The infiltrated coating thus formed is sintered at a temperature greater than 1200° C. and less than 1500° C. to form the EBC on the substrate.

Figure 1:
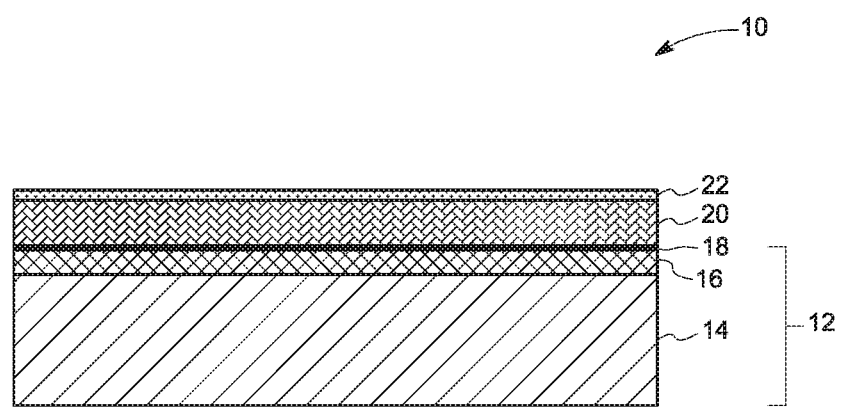
FIG. 1 is a schematic cross-sectional view of an article including an environmental barrier coating (EBC) formed on a substrate, according to some embodiments of the present invention.

FIG. 1 is a cross-sectional view of an article 10 for use, for instance, with high temperature components such as, for instance, gas-turbine engines, in accordance with one or more aspects of the present disclosure. In the illustrated example, a substrate 12, which may include a silicon-containing base 14, is provided. By way of example, the silicon-containing base 14, which may be selected for its high temperature mechanical, physical, and/or chemical properties, may include any silicon-containing material such as, for instance, silicon-containing ceramics (e.g., silicon carbide (SiC), silicon nitride ($Si_3N_4$), silicon oxynitride, silicon aluminum oxynitride), composites including a SiC or $Si_3N_4$ matrix, a silicon containing metal alloys or silicon-containing intermetallics (e.g., molybdenum-silicon alloys, niobium-silicon alloys). In one example, the silicon-containing base 14 may include a ceramic matrix composite (CMC), which includes a ceramic matrix reinforced with silicon carbide fibers. In another example, the silicon-containing base 14 may also be a monolithic ceramic material, for instance, including SiC, $Si_3N_4$ or combinations thereof. In some embodiments, the silicon-containing base 14 may be fabricated from a material that can withstand combustion environments at operating temperatures greater than 2100° F. (1149° C.) for a time duration exceeding 20,000 hours.

With continued reference to FIG. 1, EBC may be provided over the substrate 12. As used herein, the term "EBC" refers to a coating deposited on the substrate 12 for protecting the article 10 from the harsh environment of high temperature engine sections. An EBC may provide a thermal barrier as well as a hermetic seal against the corrosive gases in the hot combustion environment and thus protect the underlying substrate 12 from overheating or thermochemical attack. By way of example, as described above, the protective coating provided over silicon-containing base 14 of the substrate 12 advantageously facilitates inhibition of recession of the CMC material in a hot combustion environment of a gas-turbine engine via oxidation and volatilization upon exposure to reactive species such as water vapor. In one example, the substrate 12 may include or may be fabricated from one or more layers which include, for instance, bond coat layer 16. The bond coat layer 16 may be formed using a variety of materials and a variety of fabrication techniques, such as sol-gel chemistry, plasma spray, combustion thermal spray, electrophoretic deposition, slurry dip, slurry spray, slurry painting, chemical vapor deposition (CVD).

In some embodiments, the bond coat layer 16 may be used, for instance, to inhibit chemical reactions between the silicon-containing base 14 and the EBC 20 or to promote adhesion of the EBC 20. In another embodiment, the bond coat layer 16 may also be used as an oxygen barrier so as to inhibit or prevent exposure of the silicon-containing base 14 to oxygen in use. In one example, bond coat layer 16 may include elemental silicon, metal silicide or combinations thereof, and may have a thickness in a range from about 10 μm to about 250 μm. In some embodiments, a silica layer 18 may optionally be provided over the bond coat layer 16. In some embodiments, the silica layer 18 may have an initial (as-processed) thickness which may further increase due to the oxidation of the underlying bond coat layer 16 in use.

In some embodiments, the EBC 20 may have a thickness in a range from about 60 μm to 2 mm. In some embodiments, the EBC 20 may include a silicate of a rare earth (RE) element. As used herein, "a silicate of a rare earth element" refers to a silicate of one or more rare earth elements. In some embodiments, the silicate of the rare earth element may include, for instance, a rare earth monosilicate ($RE_2SiO_5$), a rare earth disilicate ($RE_2Si_2O_7$), or a combination thereof. In some embodiments, the rare earth element may be selected from a group consisting of yttrium, scandium, and elements of the lanthanide series. By way of example, the RE elements may include elements such as, for instance, scandium, yttrium, terbium, dysprosium, holmium, erbium, thulium, ytterbium, lutetium, or combinations thereof.

The EBC 20 may include one or more layers. Optionally, one or more additional layers may be located above or below the EBC layer 20. Such additional layers may provide additional functions to the article 10, such as thermal barrier protection, recession resistance, abradable sealing, thermochemical resistance to corrosion, resistance to erosion, resistance to impact damage, and/or resistance to inter-diffusion between adjacent layers. For example, a recession resistant surface layer 22 may be used to provide additional protection from reactive species such as, for instance, water vapor. In some embodiments, recession resistant surface layer 22 may include rare earth silicate such as, for instance, rare earth monosilicate ($RE_2SiO_5$). In some embodiments, the one or more coatings 20 and 22 may have a coefficient of thermal expansion that is substantially close to a coefficient of thermal expansion of the silicon-containing base 14.

As mentioned earlier, the method includes first disposing a powder-based coating on the substrate 12. The term "powder-based coating" as used herein refers to a coating formed using a plurality of particles. In some embodiments, the step of disposing the powder-based coating on the substrate 12 may include contacting the substrate 12 with a mixture of a first material, and a binder. In some embodiments, the step of disposing the powder-based coating on the substrate 12 may include contacting the substrate 12 with a mixture of a first material, a binder, and a sintering aid. Non-limiting examples of methods for disposing the powder-based coating on the substrate 12 may include dip coating, spray coating, spin coating, slip casting, tape casting and lamination, and gel casting. In some embodiments, the powder-based coating may be dried to form a dried powder-based coating. Drying of the powder-based coating may be carried out as a separate step or during any further heat-treatment of the powder-based coating.

The strength and density of the dried powder-based coating may depend on one or more of the relative amount of powder used, particle size of the powder, and the processing methods used for disposing the powder-based coating, among many other aspects. In some embodiments, the first material is present in the form of a plurality of particles having a multimodal distribution.

Particle size distribution of the plurality of particles used for disposing the powder-based coating may be important in determining the mechanical integrity, porosity, and processability of the disposed coating. For example, use of predominately large-sized particles may result in an uneven coating surface, and a porous and mechanically unstable coating structure. On the other hand, a coating disposed using predominately fine-sized particles may result in excessive sintering shrinkage and subsequent cracking. In some embodiments, the multimodal distribution of the particles may allow for control of the coating porosity after heat treating. Multimodal distribution of particles improves packing density by filling voids created by larger particles with finer particles. Larger particles provide a shrinkage-resistant backbone to the coating while finer particles promote sintering and bonding to the substrate. For these reasons, multimodal distribution of the particles in the coating may minimize shrinkage (during drying and/or further heat-treatment), thus mitigating crack formation and delamination during densification of thick coatings.

In some embodiments, the first material that is used for forming the powder-based coating includes a trimodal distribution of particles that includes a distribution of plurality of large, medium, and small particles. Appropriate selection and control of size and volume fractions of the large, medium, and small particles of the first material may aid in providing the EBCs with the desired properties. The particles need not be equiaxed. As used herein, the term "size" of a particle refers to the longest Euclidean distance between two points in a particle.

In some embodiments, the plurality of large particles may have a size greater than about 10 microns. In some embodiments, the plurality of large particles may have a size in a range from about 10 microns to about 80 microns. In some embodiments, the plurality of medium particles may have a size in a range from about 5 microns to about 10 microns. In some embodiments, the plurality of small particles may have a size less than about 5 microns. In some embodiments, the plurality of small particles may have a size in a range from about 0.2 microns to about 5 microns. As used herein, the "size" of a plurality of particles refers to an average size of the plurality of particles.

In some embodiments, an amount of large particles in the first material that is used for forming the powder-based coating is in a range from about 40 volume percent to about 60 volume percent of the total volume of the first material. In certain embodiments, an amount of large particles in the first material is in a range from about 45 volume percent to about 55 volume percent of the total volume of the first material. In some embodiments, an amount of medium particles in the first material is in a range from about 15 volume percent to about 30 volume percent of the total volume of the first material. In certain embodiments, an amount of medium particles in the first material is in a range from about 25 volume percent to about 30 volume percent of the total volume of the first material. In certain embodiments, an amount of the small particles in the first material is in a range from about 15 volume percent to about 30 volume percent of the total volume of the first material. In certain embodiments, an amount of small particles in the first material is in a range from about 20 volume percent to about 25 volume percent of the total volume of the first material.

In some embodiments, the first material is present in the powder-based coating in an amount in a range from about 50 volume percent to about 80 volume percent of the dried powder-based coating, wherein the remaining volume may be occupied by pores, binder, and the optional sintering aid. In some embodiments, the first material is present in the powder-based coating in an amount in a range from about 60 volume percent to about 80 volume percent of the dried powder-based coating.

In some embodiments, the first material may include one or more rare earth (RE) element and silicon. A molar ratio of the RE element to silicon, in some embodiments, may be in a range from about 0.9 to about 2.5. In some embodiments, the molar ratio of the RE element to silicon is in a range from about 0.95 to about 1.25. In some embodiments, the first material may include a rare earth monosilicate ($RE_2SiO_5$), a rare earth disilicate ($RE_2Si_2O_7$), or a combination thereof. In some embodiments, the first material includes ytterbium monosilicate, ytterbium disilicate, yttrium monosilicate, yttrium disilicate, or combinations thereof.

As mentioned earlier, in some embodiments, the powder-based coating includes a binder. Addition of binders may facilitate adhesion of the powder-based coating to the substrate and improve green strength of the powder-based coating. The binder may be an inorganic binder or an organic binder. In certain embodiments, the binder is an organic binder. The organic binders are primarily composed of elements that volatilize during processing, such that they are not present in the final EBC. Non-limiting examples of the binder include monoethylene glycol, diethylene glycol, triethylene glycol, tetraethylene glycol, glycerol, polyethylene glycol (PEG), dibutyl phthalate, bis(2-ethylhexyl) phthalate, bis(n-butyl) phthalate, butyl benzyl phthalate, diisodecyl phthalate, di-n-octyl phthalate, diisooctyl phthalate, diethyl phthalate, diisobutyl phthalate, di-n-hexyl phthalate, di(propylene glycol) dibenzoate, di(ethylene glycol) dibenzoate, tri(ethylene glycol) dibenzoate, polyvinyl pyrrolidone (PVP), or any combinations thereof. In certain embodiments, the binder includes polyvinyl pyrrolidone.

Further, the binder of the powder-based coating may include a silicon-based resin material such as, for instance, cross-linked polyorganosiloxane resin. In some embodiments, the cross-linked polyorganosiloxane resin may be, but is not limited to, silicone resin. For example, the silicone resin may be DOW Corning® 249 flake resin, which includes phenyl and methyl silsesquioxanes and methyl siloxanes.

As mentioned earlier, in some embodiments, the powder-based coating may further include an additive of a sintering aid. The term "sintering aid" as used in this context refers to a material that either decreases the sintering temperature of the coating or enhances sintering of the coating at a particular sintering temperature. Various compositions and amounts of sintering aids that may be used herein are described as "slurry sintering aid" in U.S. Pat. No. 9,005,717, which is incorporated herein by reference. In some embodiments, a sintering aid may include metallic oxides. Non-limiting examples of metallic oxide sintering aid include iron oxide, gallium oxide, aluminum oxide, nickel oxide, titanium oxide, boron oxide, and alkaline earth oxides. In some embodiments, a sintering aid may include a metal. Non-limiting examples of metallic sintering aids include iron, aluminum, boron, and nickel. In some embodiments, a sintering aid may include hydroxides, carbonates, oxalates, or any other salts of the above-mentioned metallic elements. In some embodiments, an average particle size of the sintering aid used herein is less than 100 nanometers.

In some embodiments, a dried powder-based coating may include the binder in an amount from about 2 weight percent to about 15 weight percent of the first material. In certain embodiments, an amount of the binder in the dried powder-based coating is in a range from about 4 weight percent to about 8 weight percent. In some embodiments, sintering aids may be present in the powder-based coating in an amount from about 0.2 weight percent to about 8 weight percent of the first material, and in some embodiments from about 0.5 weight percent to about 3 weight percent of the first material.

In certain embodiments, the step of disposing the powder-based coating includes contacting the substrate 12 with a first slurry. The term "slurry" as used herein refers to a mixture of at least one solid and at least one liquid, and the "first slurry" refers to the slurry including the first material. A general process for preparing a powder-based coating using a first slurry includes preparing a slurry by mixing the first material, the binder, and an optional sintering aid in a first fluid carrier, and disposing the first slurry onto the substrate 12 to obtain the powder-based coating. The powder-based coating can be allowed to dry by holding at ambient temperature and atmosphere. As mentioned earlier, in some embodiments, the powder-based coating may optionally be oven- or vacuum-dried to obtain the dried powder-based coating.

An amount of the first material, binder and sintering aid in the first slurry may be varied to control one or more characteristics, such as, for example, shrinkage and porosity of the dried powder-based coating. In some embodiments, the first material is present in the first slurry in an amount in a range from about 30 volume percent to about 65 volume percent of the first slurry. In some embodiments, the first material is present in the first slurry in an amount in a range from about 40 volume percent to about 55 volume percent of the first slurry.

As mentioned earlier, in certain embodiments, the first slurry includes a first fluid carrier. In some embodiments, the first fluid carrier may partially or fully dissolve the binder, the optional sintering aid, or a combination thereof, and may alternately be referred to as the first solvent. The first solvent may be an organic solvent or an aqueous solvent. Non-limiting examples of organic solvents may include methanol, ethanol, propanol, butanol, pentanol, hexanol, heptanol, octanol, nonanol, decanol, dodecanol, diacetyl alcohol, acetone, methyl isobutyl ketone (MIBK), methyl ethyl ketone (MEK), toluene, heptane, xylene, ether, or combinations thereof. In addition, the first solvent may include an organic solvent which, in some embodiments, facilitates dissolving of the silicon-based binder, if present. In a specific example, the organic solvent, such as butanol, dissolves a silicon-based binder to form liquid mixtures having a viscosity within a range of about 5 to 150 Pa·s at 25° C. In certain embodiments, the first solvent includes diacetyl alcohol. In some embodiments, the first solvent includes water. In some embodiments, the first slurry may include from about 40 volume percent to about 70 volume percent of the first solvent.

The first slurry may be formed using conventional techniques of mixing known to those skilled in the art, such as shaking, ball milling, attritor milling, or mechanical mixing. Ultrasonic energy may be simultaneously used along with the above-mentioned mixing methods to help in breaking apart any agglomerated particles that may be present in the first slurry.

The first slurry may be disposed on substrate 12 to form the powder-based coating using any conventional slurry deposition method known to those skilled in the art, including but not limited to, dipping the component into a slurry bath, painting, rolling, stamping, spraying, or pouring the slurry onto a surface of the substrate 12. The first slurry may optionally be mechanically agitated just before disposing on the substrate 12 by any method known to those skilled in the art so as to affect adequate dispersion of the first material, the binder, and the sintering aid in the powder-based coating formed after drying or any other further heat-treatment.

As mentioned above, depending on the silicon-containing base 14 material and the applications wherein the article 10 is used, the substrate 12 may or may not include a bond coat layer 16 or a silica layer 18. If the bond coat layer 16 is present, the first slurry may be disposed on the bond coat layer 16, and if the silica layer 18 is present, the first slurry is disposed on the silica layer 18. A thickness of the powder-based coating formed may be controlled either during the step of disposing the first slurry, or by removing excess slurry material after deposition and before drying. In some embodiments, a thickness of the dried powder-based coating may be in a range from about 100 μm to about 3 mm. In some embodiments, a thickness of the dried powder-based coating may be in a range from about 200 microns to about 1 mm.

The powder-based coating may be heat-treated at a temperature greater than 800° C. and less than 1200° C. to form a porous coating. In certain embodiments, the method includes heat-treating the powder-based coating at a temperature greater than 1050° C. and less than 1200° C. for a duration in a range from about 2 hours to about 8 hours to form the porous coating. In some embodiments, the heat treatment used herein partially sinters the powder-based coating to form the porous coating. In some embodiments, the heat-treatment may be effected at a temperature range that is about 200° C. to about 300° C. below a final sintering temperature used for forming the EBC. Further, in some embodiments, the powder-based coating may be subjected to optional drying or binder removal steps before the above-mentioned heat-treatment step. Drying or binder removal may be carried out by a slow heating or step-wise heating to a temperature less than 800° C. in an atmosphere such as air. A slow or step-wise heating of the powder-based coating helps to dissociate any bound water and to burn out the binder.

The porous coating may include predominantly surface-connected pores. As used herein the term "surface-connected pores" refers to the pores connected to a surface that is exposed to the operating environment. In some embodiments, the surface-connected pores may include multiple pores connected to each other, thereby providing a continuous path for the pores that are present in an interior portion of the porous coating to the surface. In some embodiments, the porous coating may include a porosity in a range from about 20 volume percent to about 50 volume percent of the total volume of the porous coating. The term "porosity" as used herein refers to an overall porosity, including surface-connected porosity and any closed porosity. In some embodiments, the porous coating includes a surface-connected porosity in a range up to about 45 volume percent of the total volume of the porous coating. In certain embodiments, the porous coating includes a surface-connected porosity in a range from about 10 volume percent to about 40 volume percent of the total volume of the porous coating.

The method further includes infiltrating at least some of the surface-connected pores of the porous coating with an infiltrant material to form an infiltrated coating. In some embodiments, the infiltrant material includes a second material. In some embodiments, the second material includes silicon. In some embodiments, the second material may include one or more RE element. In some embodiments, the second material may include one or more RE element and silicon. In some embodiments, the second material may include a rare earth monosilicate ($RE_2SiO_5$), a rare earth disilicate ($RE_2Si_2O_7$), or a combination thereof. In certain embodiments, the second material includes ytterbium monosilicate, ytterbium disilicate, yttrium monosilicate, yttrium disilicate, or combinations thereof.

In some embodiments, the second material is substantially the same as a material of the porous coating. Therefore, in some embodiments, the second material has a substantially same chemical composition as the first material. In some embodiments, the second material may have a different chemical composition from the first material. For example, in some embodiments, if the first material is substantially a rare earth disilicate, and hence the porous coating includes rare earth disilicate, the second material may include substantially a rare earth monosilicate.

In some embodiments, the second material includes silica. In some embodiments, the amount of rare earth element (RE) in the porous coating may be greater than the stoichiometric amount required for forming the rare earth silicate. For example, in some embodiments, if the EBC is substantially composed of a rare earth disilicate of formula $RE_2Si_2O_7$, the porous coating may include an excess of RE. Hence, an atomic ratio of the RE to silicon in the porous coating in these embodiments may be greater than 1. In these embodiments, silica may be used as the second material of the infiltrated coating and may react with the excess RE of the porous coating during a sintering step of the infiltrated coating so as to result in an EBC that is substantially composed of a rare earth disilicate.

In some embodiments, the infiltrant material includes a second slurry including a plurality of fine particles of a second material, a precursor solution including a precursor of the second material, or a combination thereof.

In certain embodiments, the infiltrant material includes the second slurry. As used herein, the term "second slurry"

refers to the slurry including the second material. In some embodiments, the plurality of fine particles may have a particle size less than 500 nanometers (nm). In certain embodiments, the plurality of fine particles may have a particle size less than 200 nm. In some embodiments, an amount of the second material in the second slurry may be in a range from about 5 volume percent to about 35 volume percent of the second slurry. In some embodiments, an amount of the second material in the second slurry may be in a range from about 20 volume percent to about 30 volume percent of the second slurry. The second slurry may include a second fluid carrier. In some embodiments, the second fluid carrier may be a second solvent such as, for example, an aqueous or organic solvent.

In some embodiments, the infiltrant material includes a precursor solution including a precursor of the second material. As used herein, the term "precursor" of the second material refers to a material which, when heat-treated at appropriate temperature, decomposes to provide the second material as one of the decomposition products. In some embodiments, the precursor may include precursors of silica or precursors of rare earth silicates, such as precursors of rare earth monosilicate or precursors of rare earth disilicate. The precursor solution may be an aqueous, inorganic or organic solution. In some embodiments, the precursor solution may be converted into a gel form after infiltrating into the porous coating.

In some embodiments, the second slurry and the precursor solution may further include one or more binders, sintering aids or a combination thereof. The binder and sintering aid optionally used in the second slurry and the precursor solution may be similar to or distinct from those used with the first slurry.

Infiltrating the porous coating may lead to densification of the porous coating. Various methods may be used for the infiltration step. For example, in some embodiments, the second slurry or the precursor solution may be infiltrated into the porous coating by dipping, with an optional vacuum infiltration step. In this embodiment, the substrate with the porous coating disposed thereon may be dipped inside the second slurry or the precursor solution in a container and the container may be evacuated until all the pores of the porous coating are filled with the second slurry or the precursor solution. The infiltrated coating may then be dried to remove the solvent. Further, in some embodiments, the infiltrated coating may be subjected to optional binder removal, dehydration, or precursor decomposition steps. These steps may be carried out by a slow heating or step-wise heating to a temperature less than 800° C. in air or a similarly oxidizing atmosphere. The infiltrating and drying steps may be repeated multiple times to increase a content of the second material or a precursor of the second material in the infiltrated coating.

In some embodiments, the infiltrated coating is further subjected to a sintering step. In some embodiments, the infiltrated coating is sintered at a temperature greater than 1200° C. and less than 1500° C. to form the environmental barrier coating on the substrate. In some embodiments, the infiltrated coating is sintered at a temperature greater than 1250° C. and less than 1400° C. In some embodiments, as mentioned previously, the sintering temperature of the infiltrated coating may be at least 200° C. higher than the heat-treatment temperature used for forming the porous coating. Sintering at higher temperature than the heat-treatment temperature facilitates removal of remaining pores after infiltration. Sintering the infiltrated coating in this temperature range may help to decrease the interconnected porosity, and thereby form a substantially hermetic EBC 20. As used herein, the term "hermetic EBC" refers to a coating that does not provide a continuous path to water vapor from the operating atmosphere to the substrate 12, in an operating condition of the article 10.

The heat treatment and sintering steps may be effected using a conventional furnace or by using such methods as microwave sintering, laser sintering, infrared sintering, and the like.

In some embodiments, sintering may be accomplished by heating the infiltrated coating at a rate from about 1° C./min to about 15° C./min to a temperature in a range from greater than 1200° C. to less than 1500° C., and holding the coating at that temperature for up to about 24 hours. In another embodiment, sintering may be accomplished by heating the infiltrated coating at a rate from about 5° C./min to about 10° C./min to a temperature in a range from greater than 1300° C. to less than 1375° C. and holding the coating at that temperature for up to about 24 hours. In some other embodiments, sintering may be effected rapidly by placing the infiltrated coating in a furnace pre-heated to a temperature in a range from greater than 1200° C. to less than 1500° C.

The sintering step may be carried out in ambient air or in a gaseous atmosphere, where a gas of the gaseous atmosphere may be selected from hydrogen, nitrogen, a noble gas such as helium, neon, argon, krypton, xenon, or mixtures thereof. In some embodiments, the inert gas atmosphere may be used in conjunction with sintering aids of the first slurry or the second slurry or precursor, so as not to convert the metal sintering aid to an oxide before it melts, thereby promoting liquid phase sintering and reaction of the porous coating with the infiltrated material.

Figure 2:
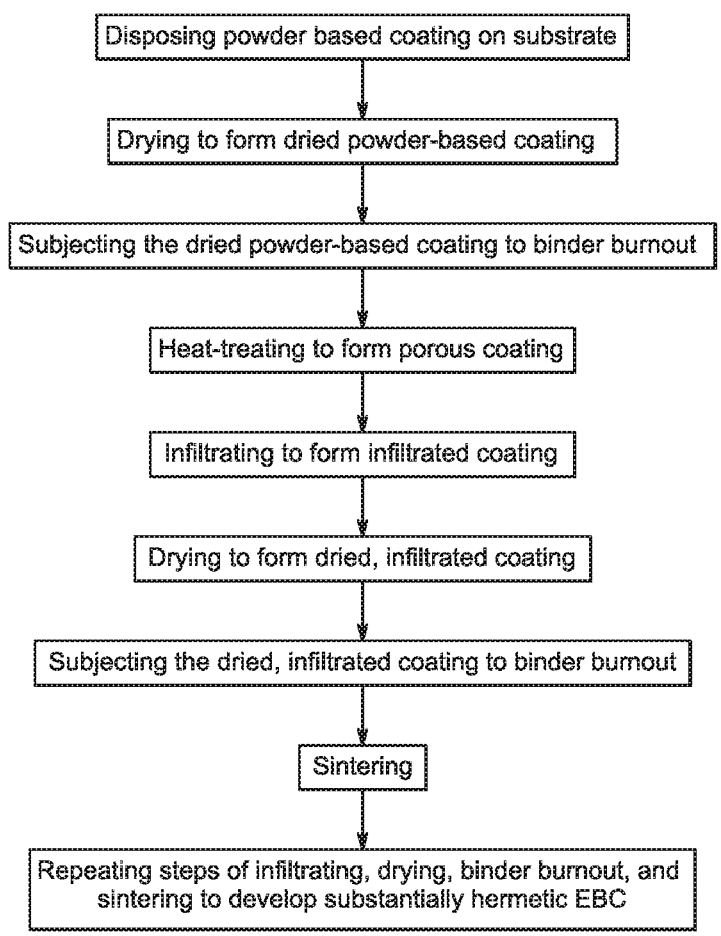
FIG. 2 is a process map of the method of depositing an EBC, according to some embodiments of the present invention.

FIG. 2 illustrates a process map for a method of forming the EBC 20 on the substrate 12 in accordance to certain embodiments. The method includes disposing a powder-based coating on the substrate 12, drying the powder-based coating to form a dried powder-based coating, subjecting the dried powder-based coating to binder burnout process, further heat-treating to form a porous coating that includes surface-connected pores, infiltrating at least some of the surface-connected pores of the porous coating to form an infiltrated coating, drying the infiltrated coating to form a dried infiltrated coating, subjecting the dried infiltrated coating to binder burnout process, and sintering to form the EBC 20. The steps of infiltrating, drying, binder burnout, and sintering may be optionally repeated multiple times to develop a substantially hermetic EBC 20.

In some embodiments, the method of forming the EBC 20 on the substrate 12 includes disposing a powder-based coating on the substrate 12 by disposing a first slurry onto substrate 12, heat-treating the powder-based coating at a temperature greater than 1050° C. and less than 1200° C. to form a porous coating that includes surface-connected pores, infiltrating at least some of the surface-connected pores of the porous coating with a second slurry to form an infiltrated coating, and sintering the infiltrated coating at a temperature greater than 1200° C. and less than 1400° C. The EBC 20 thus formed has a thickness greater than 100 microns and is substantially hermetic.

In some embodiments, the EBC 20 has a thickness in a range from about 60 μm to about 2 mm. In some embodiments, the EBC 20 has a thickness in a range from about 100 μm to about 600 μm. In some embodiments, the EBC 20 has an overall porosity less than 10 volume percent. As mentioned earlier, the methods in accordance with embodiments of the invention provide for thick, hermetic EBCs while avoiding multiple deposition and sintering steps that are used for conventional slurry-based deposition of EBCs. In some embodiments, a thickness greater than 400 µm may be achieved using a single sequence of powder coating deposition, heat treatment, infiltration and sintering.

As described above, in some embodiments, the article including the EBC 20 may be a turbine engine component, such as, for example, a blade, a vane, a combustor liner or a shroud, that is subjected to high gas temperatures. Further, such components may be incorporated into systems including, without limitations, other components that are subjected to extreme thermal and/or chemical conditions during operation. In some embodiments, the present disclosure presents a turbine engine component including an EBC 20 formed by the method described hereinabove.

Example

The following example illustrates methods, materials and results, in accordance with specific embodiments, and as such should not be construed as imposing limitations upon the claims. All components are commercially available from common chemical suppliers.

Ytterbium disilicate powders having an average particle size of about 30 microns (large particles), about 2 microns (small particles), and about 8 microns (medium particles) were mixed in a ratio of about 50 volume percent of large particles, about 25 volume percent of medium particles, and about 25 volume percent of small particles so as to form substantially 100% of the first material. The first slurry was prepared with about 15 gram (g) of ytterbium disilicate, about 0.85 g of diacetyl alcohol, about 0.81 g of diethylene glycol, about 0.6 g of PVP, about 0.1 g of a mixture of nano-sized iron oxide and nano-sized alumina powders.

The ytterbium disilicate particles, solvent, binders, and sintering aids were mixed and agitated using a planetary mixer to form the first slurry. The CMC substrate, having a silicon bond coat, was coated by dipping into the first slurry. The coated component was dried in an oven overnight at a temperature of about 150° C. Thickness of the dried, powder-based coating obtained was about 400 microns. The coated substrate was further subjected to a binder burnout in a box furnace with a heating rate of 1° C./minute and a hold at 350° C. and 500° C. for about 1 hour each. The coated substrate was further heat-treated at a temperature of about 1100° C. for about 2 hours in air. The resultant article with the porous coating was furnace cooled. The porous coating was found to have a thickness of about 350 microns, relative density of about 65 volume percent and a good adherence to the substrate.

A second slurry, Ludox 40™, having about 20 volume percent of silica in water and containing about 250 ppm of total biocides was procured from Sigma-Aldrich. This slurry was infiltrated into the porous coating using a vacuum infiltration technique and dried at 110° C. The infiltration and drying process were repeated once. The resultant infiltrated article was sintered in air at a temperature of about 1344° C. for about 8 hours.

The resultant EBC was found to be about 350 microns thick and had a relative density greater than 95 volume percent. Upon exposing the article to about 250 cycles in 1315° C. steam for a total duration of 500 hours, it was observed that the thick coating remained attached to the substrate 12 and the thickness of the thermally grown oxide (TGO) formed at the interface of the substrate and the EBC was comparable to that observed in hermetic EBC standards.

The methods in accordance with embodiments described herein may offer a variety of benefits over current manufacturing processes. Specifically, as previously described, infiltration of second slurry having fine particles into the porous coating aids in forming a thick hermetic EBC layer in a single pass.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of forming an environmental barrier coating, comprising:
   disposing a powder-based coating on a substrate such that a layer of coating is defined and the layer of coating is positioned on the substrate and defines a first surface positioned adjacent the substrate and an opposing second surface positioned outwardly away from the substrate and first surface;
   heat-treating the powder-based coating at a temperature greater than 800° C. and less than 1200° C. to form a porous coating from the layer of coating such that the porous coating comprises surface-connected pores such that the pores are fluidly connected to the second surface;
   infiltrating at least some of the surface-connected pores of the porous coating with an infiltrant material to form an infiltrated coating such that the infiltrated coating continues to define the second surface; and
   sintering the infiltrated coating at a temperature greater than 1200° C. and less than 1500° C. to form the environmental barrier coating from the infiltrated coating on the substrate such that the environmental coating continues to define the second surface; and
   wherein the powder-based coating comprises a first material present in the form of a plurality of particles having a multimodal distribution and the plurality of particles comprise a plurality of large particles with a particle size greater than about 10 microns, a plurality of medium particles with a particle size in a range from about 5 microns to about 10 microns, and a plurality of small particles with a particle size less than about 5 microns and an amount of large particles in the first material is in a range from about 40 to about 60 volume percent of the total volume of the first material; an amount of medium particles in the first material is in a range from about 15 to about 30 volume percent of the total volume of the first material; and an amount of small particles in the first material is in a range from about 15 to about 30 volume percent of the total volume of the first material.

2. The method of claim 1, wherein the first material comprises a silicate of a rare earth element, comprising a rare earth monosilicate ($RE_2SiO_5$), a rare earth disilicate ($RE_2Si_2O_7$), or a combination thereof.

3. The method of claim 2, wherein the rare earth element comprises ytterbium, yttrium, or a combination thereof.

4. The method of claim 1, wherein the step of disposing the powder-based coating on the substrate comprises contacting the substrate with the first material, a binder, and a sintering aid.

5. The method of claim 4, wherein the powder-based coating comprises the binder in an amount in a range from about 2 weight percent to about 15 weight percent of the first material and the sintering aid in an amount in a range from about 0.2 weight percent to about 8 weight percent of the first material.

6. The method of claim 4, wherein disposing the powder-based coating comprises contacting the article with a first slurry comprising the first material, a first fluid carrier, the binder, and the sintering aid, wherein the first material is present in the first slurry in an amount in a range from about 30 to about 65 volume percent of the first slurry.

7. The method of claim 1, comprising heat-treating the powder-based coating at a temperature greater than 1050° C. and less than 1200° C. for a time duration in a range from about 2 hours to about 8 hours to form the porous coating.

8. The method of claim 1, wherein the porous coating has a porosity in a range from about 20 to about 50 percent by volume.

9. The method of claim 1, wherein the infiltrant material comprises a second slurry comprising a plurality of fine particles of a second material, a precursor solution comprising a precursor of the second material, or a combination thereof.

10. The method of claim 9, wherein the plurality of fine particles have a particle size less than about 500 nm.

11. The method of claim 9, wherein the second material is present in the second slurry in an amount in a range from about 5 to about 35 volume percent.

12. The method of claim 9, wherein the second material comprises silicon.

13. The method of claim 12, wherein the second material comprises silica.

14. The method of claim 9, wherein the second material is substantially the same as a first material of the porous coating.

15. The method of claim 1, wherein the environmental coating includes the powder-based coating and the infiltrated coating and a thickness of the environmental barrier coating is greater than 100 microns and the environmental coating has a porosity less than 10 percent by volume.

16. The method of claim 1, wherein the substrate is a turbine engine component.

17. A method of forming an environmental barrier coating, comprising
disposing a powder-based coating on a substrate by contacting the article with a first slurry;
heat-treating the powder-based coating at a temperature greater than 1050° C. and less than 1200° C. to form a porous coating that defines a first surface adjacent the substrate and an opposing second surface positioned outwardly away from the substrate and first surface and the porous coating comprising surface-connected pores that are fluidly connected to the second surface;
infiltrating at least some of the surface-connected pores of the porous coating with a second slurry to form an infiltrated coating, the infiltrated coating continuing to define the second surface; and
sintering the infiltrated coating at a temperature greater than 1200° C. and less than 1400° C. to form the environmental barrier coating on the substrate, the environmental barrier coating continuing to define the second surface, wherein
a thickness of the environmental barrier coating is greater than 100 microns; and
the environmental barrier coating is substantially hermetic.

* * * * *